United States Patent
Degner et al.

(10) Patent No.: US 8,976,528 B2
(45) Date of Patent: Mar. 10, 2015

(54) FASTENERS AND DUAL-THICKNESS THERMAL STAGES IN ELECTRONIC DEVICES

(75) Inventors: Brett W. Degner, Menlo Park, CA (US); Patrick Kessler, San Francisco, CA (US); Charles A. Schwalbach, Menlo Park, CA (US); Richard H. Tan, Fremont, CA (US); William F. Leggett, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 13/614,996

(22) Filed: Sep. 13, 2012

(65) Prior Publication Data

US 2013/0329368 A1 Dec. 12, 2013

Related U.S. Application Data

(60) Provisional application No. 61/657,534, filed on Jun. 8, 2012, provisional application No. 61/657,538, filed on Jun. 8, 2012.

(51) Int. Cl.
*H05K 7/20* (2006.01)
*F28F 7/00* (2006.01)
*F28D 15/04* (2006.01)
*G01F 1/20* (2006.01)

(52) U.S. Cl.
USPC ...... 361/707; 361/679.47; 361/700; 361/704; 361/719; 165/80.2; 165/80.3; 165/104.26; 165/104.33

(58) Field of Classification Search
CPC ............. H05K 7/20; G06F 1/20; G06F 1/203; H01L 23/427
USPC ....................... 361/679.46–679.55, 688, 689, 361/700–722; 165/80.2–80.5, 165/104.19–104.26, 104.33, 185; 174/15.1, 174/15.2, 16.3; 257/715–724
See application file for complete search history.

(56) References Cited

U.S. PATENT DOCUMENTS

| | | | | |
|---|---|---|---|---|
| 7,414,850 | B2 * | 8/2008 | Hung | 361/719 |
| 7,952,878 | B2 * | 5/2011 | Lian et al. | 361/700 |
| 8,247,698 | B2 * | 8/2012 | Hwang et al. | 174/252 |
| 8,488,322 | B2 * | 7/2013 | Huang et al. | 361/700 |
| 2004/0184238 | A1 * | 9/2004 | Yang | 361/704 |
| 2006/0260787 | A1 * | 11/2006 | Wu et al. | 165/104.33 |
| 2007/0272395 | A1 * | 11/2007 | Hwang et al. | 165/104.33 |
| 2008/0156460 | A1 * | 7/2008 | Hwang et al. | 165/80.3 |
| 2009/0044927 | A1 * | 2/2009 | Hwang et al. | 165/80.3 |
| 2010/0124026 | A1 * | 5/2010 | Wang et al. | 361/715 |
| 2011/0032675 | A1 * | 2/2011 | Lian et al. | 361/697 |
| 2011/0114295 | A1 * | 5/2011 | Chiu | 165/104.26 |

\* cited by examiner

*Primary Examiner* — Michail V Datskovskiy
(74) *Attorney, Agent, or Firm* — Park, Vaughan, Fleming & Dowler LLP; Chia-Hsin Suen

(57) ABSTRACT

The disclosed embodiments provide a system that facilitates heat transfer in an electronic device. The system includes a heat pipe configured to conduct heat away from a heat-generating component in the electronic device. The system also includes a thermal stage disposed along a thermal interface between the heat-generating component and the heat pipe, wherein the thermal stage applies a spring force between the heat-generating component and the heat pipe. The thermal stage includes a first thickness to accommodate the heat pipe and a second thickness that is greater than the first thickness to increase a spring force between the heat-generating component and the heat pipe. Finally, the system includes a set of fasteners configured to fasten the thermal stage to a surface within the electronic device and form a thermal gap between the heat pipe and an enclosure of the electronic device.

27 Claims, 15 Drawing Sheets

ND DUAL-THICKNESS
FASTENERS AND DUAL-THICKNESS THERMAL STAGES IN ELECTRONIC DEVICES

RELATED APPLICATION

This application claims the benefit of U.S. Provisional Application No. 61/657,534, entitled "Fasteners for Creating Thermal Gaps in Electronic Devices," by inventors Brett Degner, Charles A. Schwalbach and William F. Leggett, filed 8 Jun. 2012.

This application also claims the benefit of U.S. Provisional Application No. 61/657,538, entitled "Dual-Thickness Thermal Stages in Electronic Devices," by inventors Brett Degner, Patrick Kessler, Charles A. Schwalbach and Richard Tan, filed 8 Jun. 2012.

BACKGROUND

1. Field

The disclosed embodiments relate to techniques for facilitating heat transfer in electronic devices. More specifically, the disclosed embodiments relate to fasteners for creating thermal gaps and dual-thickness thermal stages in electronic devices.

2. Related Art

A modern portable electronic device typically contains a set of tightly packed components. For example, a laptop computer may include a keyboard, display, speakers, touchpad, battery, buttons, processor, memory, internal storage, and/or ports in an enclosure that is less than one inch thick, 8-11 inches long, and 12-16 inches wide. Moreover, most components in the portable electronic device generate heat, which must be dissipated to enable safe use of the portable electronic device and improve long-term reliability. For example, heat generated by components in a laptop computer may be transferred away from the components and out of the laptop computer to prevent damage to the components and increase user comfort and safety while operating the laptop computer.

However, heat-dissipation mechanisms for portable electronic devices generally involve the use of additional parts and/or materials. For example, heat sinks, cooling fans, heat pipes, thermal spreaders, and/or vents may be used to dissipate heat from components in a laptop computer. Such heat-dissipating parts and/or materials may take up space within the portable electronic devices and may add to the cost of the portable electronic devices.

Hence, space-efficient designs for portable electronic devices may be facilitated by more efficient and/or smaller heat-dissipation mechanisms in the portable electronic devices.

SUMMARY

The disclosed embodiments provide a system that facilitates heat transfer in an electronic device. The system includes a heat pipe configured to conduct heat away from a heat-generating component in the electronic device. The system also includes a thermal stage disposed along a thermal interface between the heat-generating component and the heat pipe, wherein the thermal stage applies a spring force between the heat-generating component and the heat pipe. The thermal stage includes a first thickness to accommodate the heat pipe and a second thickness that is greater than the first thickness to increase a spring force between the heat-generating component and the heat pipe. Finally, the system includes a set of fasteners configured to fasten the thermal stage to a surface within the electronic device and form a thermal gap between the heat pipe and an enclosure of the electronic device.

In some embodiments, the set of fasteners includes a screw.

In some embodiments, the thermal gap is formed by a head of the screw.

In some embodiments, the head includes an insulating material. For example, the head may be made of plastic and/or include a plastic cap.

In some embodiments, the surface is a printed circuit board (PCB) in the electronic device.

In some embodiments, the heat-generating component is a central processing unit (CPU) and/or a graphics-processing unit (GPU).

In some embodiments, the thermal interface also includes a thermal interface material (TIM) disposed between the heat-generating component and the thermal stage.

In some embodiments, the heat pipe is joined to the thermal stage using a solder.

In some embodiments, the first thickness decreases an overall thickness of the electronic device.

In some embodiments, the first thickness is created in the thermal stage using at least one of a machining technique, a rolling technique, a skiving technique, a continuous-machining technique, a chemical-etching technique, a coining technique, a casting technique, and a forging technique.

In some embodiments, the thermal stage includes copper titanium.

In some embodiments, the heat pipe includes copper.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
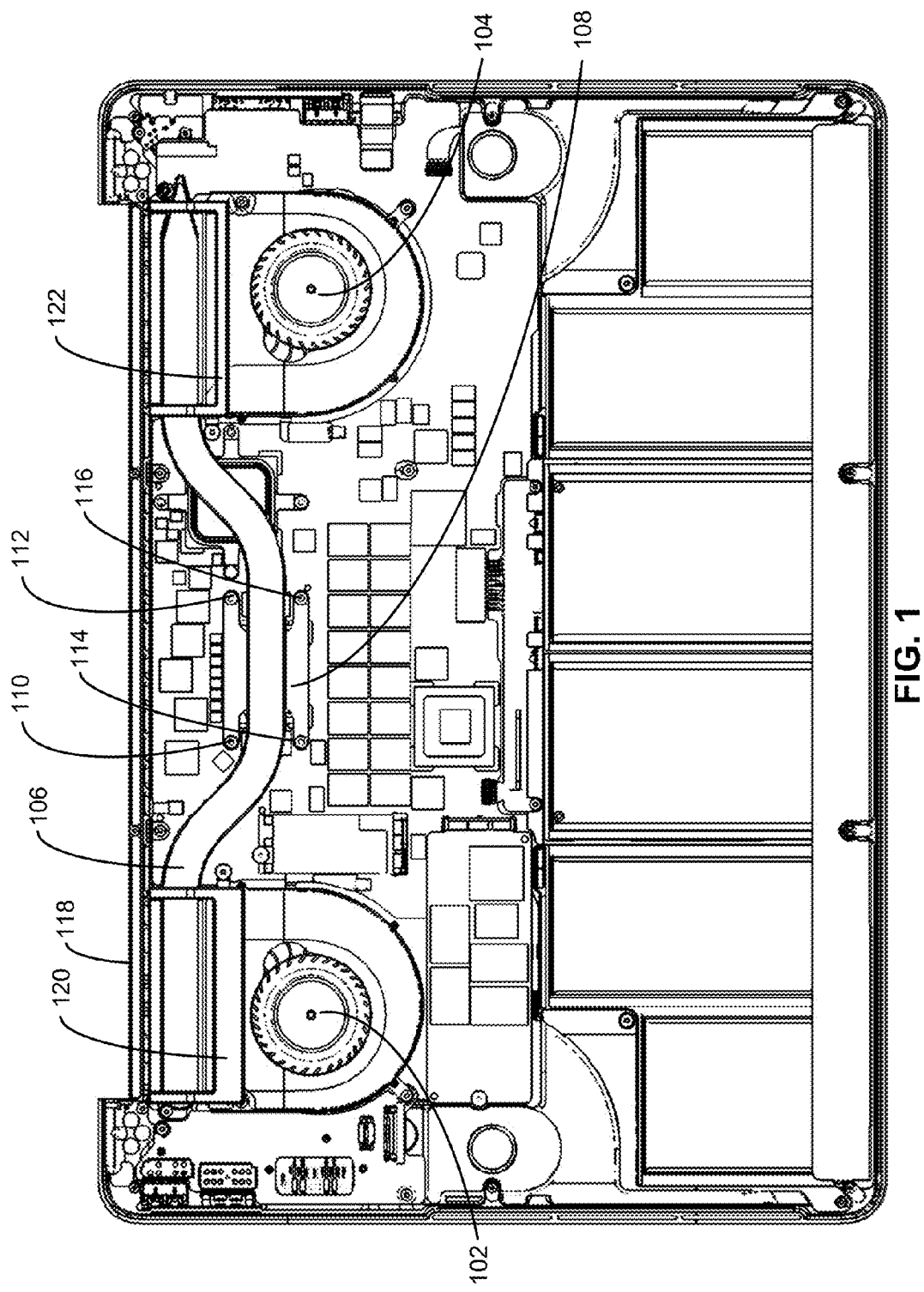
FIG. 1 shows a bottom view of an electronic device in accordance with the disclosed embodiments.

FIG. 1 shows a bottom view of an electronic device in accordance with the disclosed embodiments. More specifically, FIG. 1 shows an electronic device, such as a laptop computer, with the bottom of the electronic device's enclosure removed. Within the electronic device, a number of components may be used to cool heat-generating components such as central-processing units (CPUs), graphics-processing units (GPUs), and/or video memory.

First, the electronic device may include a set of fans 102-104 for expelling heat generated by the heat-generating components outside the electronic device. Fans 102-104 may utilize a set of intake and exhaust vents along a wall 118 of the electronic device to draw in cooler air from outside the electronic device, circulate the air around the interior of the electronic device to dissipate heat from the heat-generating components, and expel the heated air out of the electronic device.

The electronic device may also include a heat pipe 106 that conducts heat away from one or more of the heat-generating components toward the flow of exhaust from fans 102-104. For example, heat pipe 106 may be a sealed pipe of a thermally conductive material, such as copper, filled with a working fluid such as water, ethanol, acetone, sodium, and/or mercury in a partial vacuum. The working fluid may evaporate to vapor at the thermal interface with a heat-generating component closer to the center of heat pipe 106, migrate to an end of heat pipe 106 that is cooled by a fan (e.g., fans 102-104), and condense back into liquid after the heat is removed by the fan. A sintered material (e.g., metal powder) in the interior of heat pipe 106 may then exert capillary pressure on the condensed liquid, conducting the liquid back to the heated portion of heat pipe 106 for subsequent transfer of heat away from the heat-generating component.

To further facilitate heat dissipation from the heat-generating component, a thermal stage 108 may apply a spring force between heat pipe 106 and the heat-generating component. For example, thermal stage 108 may be bonded to heat pipe 106 using a solder and fastened to a surface within the electronic device using a set of fasteners 110-116 to increase the amount of heat transferred along a thermal interface between the heat-generating component and heat pipe 106.

In one or more embodiments, heat-dissipation mechanisms and/or components in the electronic device may include a number of characteristics and/or features that increase the transfer of heat away from the heat-generating components and/or facilitate efficient use of space within the electronic device. First, fasteners 110-116 may both fasten thermal stage 108 to a surface within the electronic device and create a thermal gap between heat pipe 106 and the enclosure of the electronic device, as discussed below with respect to FIG. 2. Second, thermal stage 108 may include two thicknesses to reduce an overall thickness of the electronic device while maintaining the spring force necessary to adequately cool the heat-generating component over which thermal stage 108 and heat pipe 106 are disposed, as described in further detail below with respect to FIGS. 3-4.

Third, wall 118 may include intake vents that are directed at a first angle toward one or more heat-generating components of the electronic device and exhaust vents directed at a second angle out of the electronic device to avoid a display of the electronic device. Wall 118 may also include one or more obstructed vents between the intake and exhaust vents, as well as mechanisms for reducing the temperature of hot spots in the enclosure of the electronic device. Wall 118 is described in further detail below with respect to FIGS. 5-8.

Finally, a set of gaskets 120-122 may provide thermal ducts between fans 102-104 and exhaust vents in wall 118 to prevent exhaust from recirculating inside the electronic device and reducing the effectiveness of heat dissipation from the heat-generating components. As discussed below with respect to FIGS. 9-11, gaskets 120-122 may include a rigid section that forms the duct, as well as a set of flexible sections that simplify assembly of heat pipe 106 on top of the rigid section and subsequently seal the duct around heat pipe 106.

Figure 2:
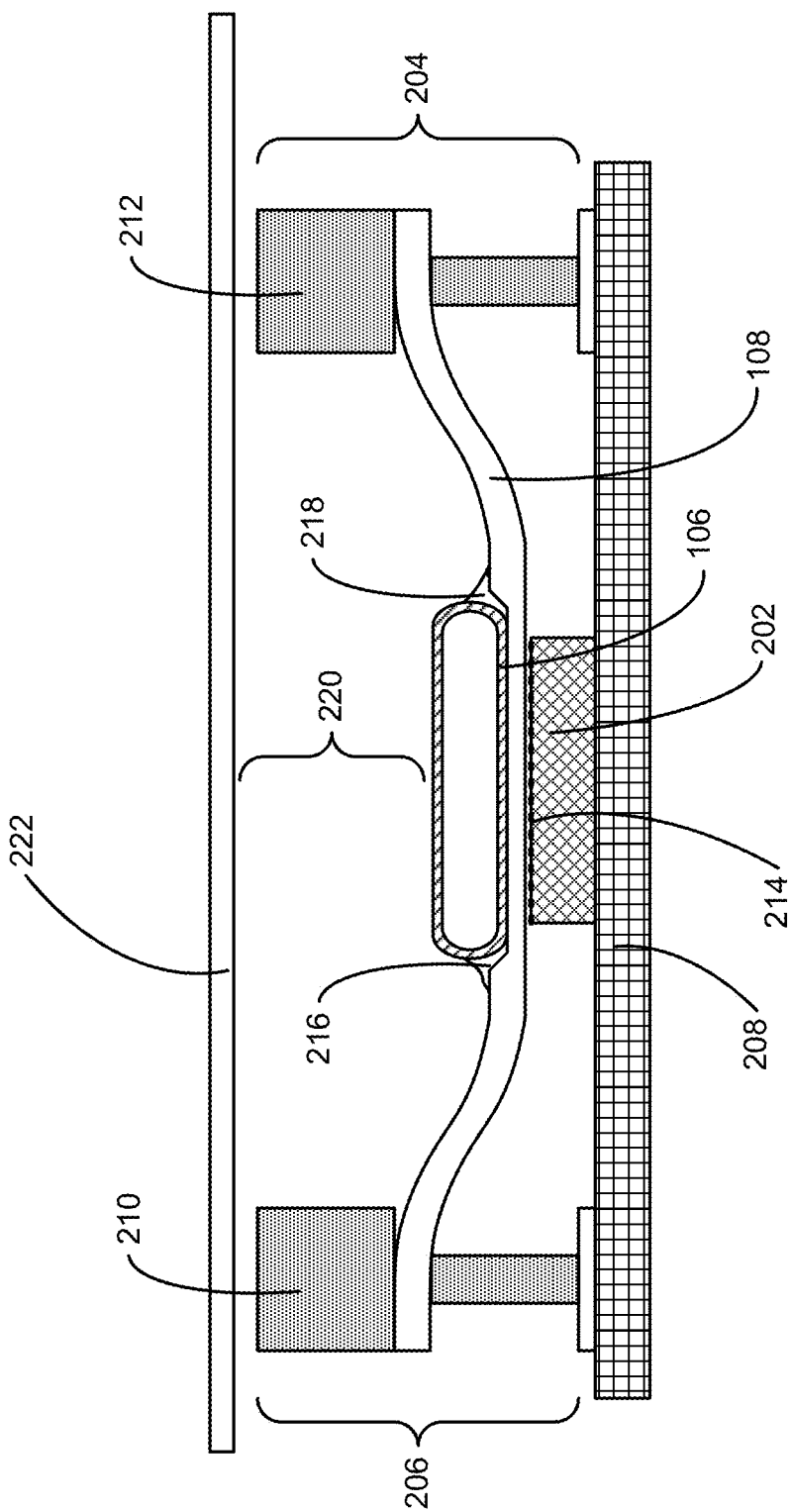
FIG. 2 shows a cross-sectional view of a system for facilitating heat transfer in an electronic device in accordance with the disclosed embodiments.

FIG. 2 shows a cross-sectional view of a system for facilitating heat transfer in an electronic device (e.g., the electronic device of FIG. 1) in accordance with the disclosed embodiments. The system includes heat pipe 106 and thermal stage 108, both of which are disposed over a heat-generating component 202 such as a CPU and/or GPU.

As shown in FIG. 2, thermal stage 108 may be disposed along a thermal interface in between heat pipe 106 and heat-generating component 202. A thermal interface material (TIM) 214 may also be disposed within the thermal interface between heat-generating component 202 and thermal stage 108 to increase the thermal contact conductance between heat-generating component 202 and thermal stage 108.

In one or more embodiments, the spring force of thermal stage 108 is used to increase thermal contact between heat-generating component 202 and heat pipe 106. For example, thermal stage 108 may improve heat conduction between heat-generating component 202 and heat pipe 106 by reducing the thickness and, in turn, the thermal resistance of TIM 214. As a result, thermal stage 108 may be made of a material with a high thermal conductivity and spring constant, such as copper titanium.

To provide thermal contact between heat-generating component 202 and heat pipe 106, heat pipe 106 may be joined to thermal stage 108 using a solder 216-218, and thermal stage 108 may be fastened to a surface 208 within the electronic device using a set of fasteners 204-206 (e.g., fasteners 110-116 of FIG. 1). For example, fasteners 204-206 may include one or more screws that fasten a set of wings of thermal stage 108 to a printed circuit board (PCB) containing heat-generating component 202. Fasteners 204-206 and thermal stage 108 may thus apply downward force onto heat-generating component 202 and increase the thermal coverage of heat-generating component 202 by heat pipe 106.

Fasteners 204-206 may additionally form a thermal gap 220 between heat pipe 106 and an enclosure 222 of the electronic device. Continuing with the above example, screws used to provide fasteners 204-206 may have tall heads 210-212 that provide a 0.5 mm-0.8 mm thermal gap 220 and/or plenum through which air may flow to further cool heat-generating component 202 and/or other heat-generating components in the electronic device. Alternatively, other types of fasteners 204-206 may be used to provide thermal gap 220, including clips, barbed fasteners, bolts, clamps, pins, pegs, and/or clasps.

Thermal gap 220 may also prevent heat pipe 106 from thermally contacting enclosure 222 if the electronic device is dropped and/or impacts another object. For example, fasteners 204-206 may be placed around heat-generating component 202 if heat-generating component 202 is located relatively far from an attachment point of a metal enclosure 222 to ensure that trampolining in enclosure 222 does not cause heat pipe 106 to transfer heat to enclosure 222 and/or a surface contacting enclosure 222. Fasteners 204-206 may further be attached to a surface (e.g., the center of a PCB) with lower stiffness so that the impact does not damage heat-generating component 202 and/or other nearby components.

However, the proximity of fasteners 204-206 to enclosure 222 may result in physical contact between fasteners 204-206 and enclosure 222. For example, fasteners 204-206 may touch enclosure 222 if fasteners 204-206 are designed to be intimate with enclosure 222 and/or if fasteners 204-206 are brought in contact with enclosure 222 during impact between enclosure 222 and a hard object.

As a result, fasteners 204-206 may include an insulating material to prevent fasteners 204-206 from heating enclosure 222 in the event of physical contact between the fasteners 204-206 and enclosure 222. For example, fasteners 204-206 may be made of plastic to reduce thermal conduction between fasteners 204-206 and enclosure 222. Consequently, fasteners 204-206 may improve thermal contact between heat-generating component 202 and heat pipe 106, provide thermal gap 220 as a channel for airflow and/or heat dissipation from heat-generating component 202 and/or heat pipe 106, and facilitate safe operation of the electronic device by thermally insulating enclosure 222 from heat-generating component 202 and/or heat pipe 106.

Figure 3:
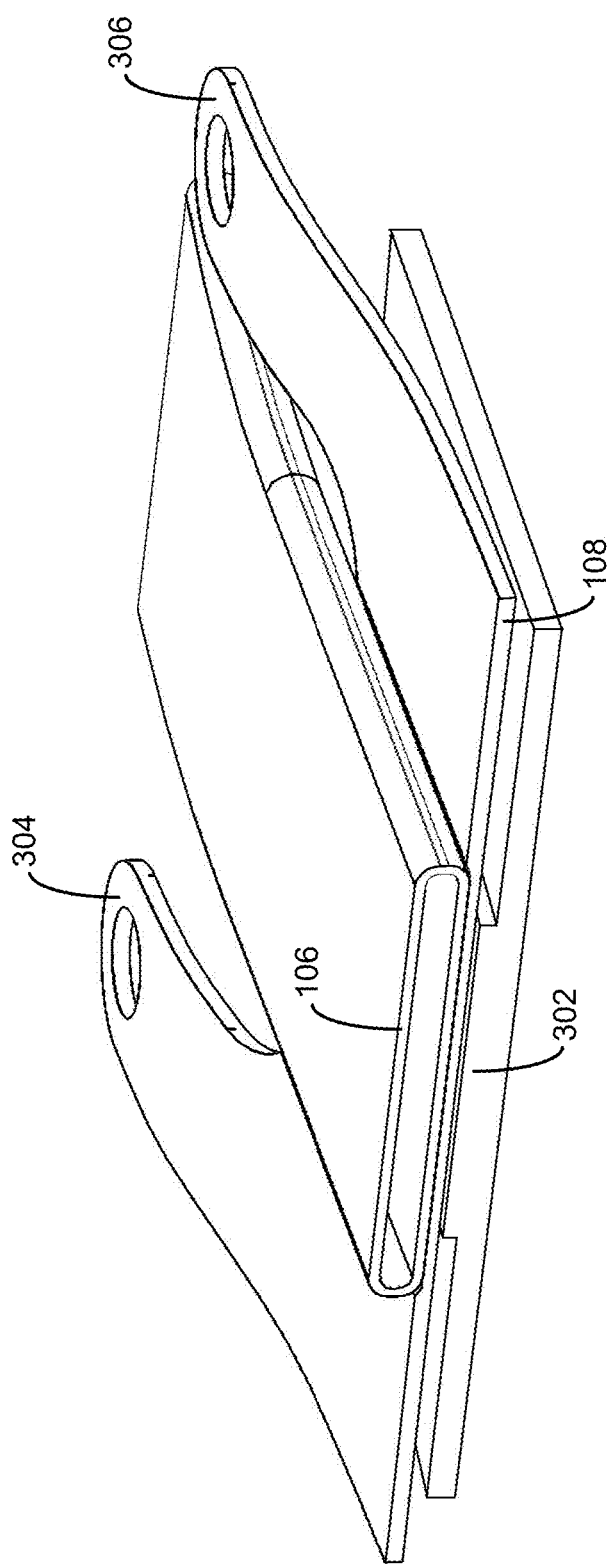
FIG. 3 shows a sectional view of a system for facilitating heat transfer in an electronic device in accordance with the disclosed embodiments.

FIG. 3 shows a sectional view of a system for facilitating heat transfer in an electronic device in accordance with the disclosed embodiments. As mentioned above, the system may include heat pipe 106 and thermal stage 108, both of which are disposed over a heat-generating component 302 (e.g., a CPU). Heat pipe 106 may be soldered to thermal stage 108, and a set of wings 304-306 of thermal stage 108 may be fastened to a surface within the electronic device to apply a spring force to heat-generating component 302. For example, the fastening of wings 304-306 that are angled upward to a PCB containing heat-generating component 302 may apply a downward force onto heat-generating component 302 and increase the thermal contact conductance between heat-generating component 302 and heat pipe 106.

Figure 4:
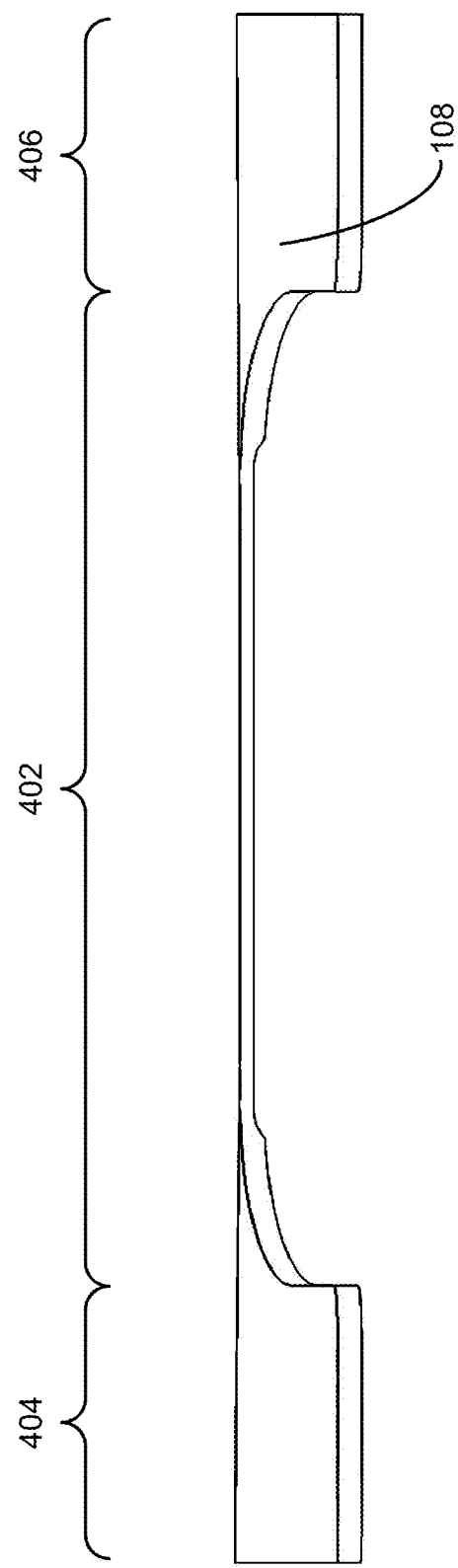
FIG. 4 shows a side view of a thermal stage in accordance with the disclosed embodiments.

FIG. 4 shows a side view of thermal stage 108 in accordance with the disclosed embodiments. Thermal stage 108 may include a number of regions 404-406 with different thicknesses. In particular, region 402 may be of a first thickness, and regions 404-406 may be of a second thickness that is greater than the first thickness.

The first and/or second thicknesses may be created in thermal stage 108 using a number of techniques. For example, a machining technique may be used to form a trough in a material (e.g., copper titanium) of uniform stock thickness. Similarly, a profile corresponding to the first thickness may also be formed in raw stock using a rolling technique. The first thickness may further be created by removing material from uniform stock using a skiving technique, continuous machining technique, and/or chemical-etching technique. A forging and/or coining technique may be used to press the first thickness into uniform stock, or a casting technique may be used to form the first and second thicknesses from a mold.

As mentioned above, the first thickness may accommodate a heat pipe (e.g., heat pipe 106 of FIG. 1). For example, the first thickness may form a notch and/or groove within which the heat pipe may be placed to reduce an overall thickness of the electronic device containing thermal stage 108 and the heat pipe. On the other hand, the second thickness may increase a spring force between a heat-generating component and the heat pipe, allowing for better thermal transfer between the heat-generating component (e.g., a high-power CPU) and the heat pipe. For example, the second thickness may be used in the wings (e.g., wings 304-306 of FIG. 3) of thermal stage 108 to increase the downward force applied by thermal stage 108 and/or a set of fasteners (e.g., fasteners 110-116 of FIG. 1) onto the top of the heat-generating component. Consequently, the first and second thicknesses may facilitate both efficient use of space within the electronic device and increased cooling of the heat-generating component by the heat pipe.

Figure 5:
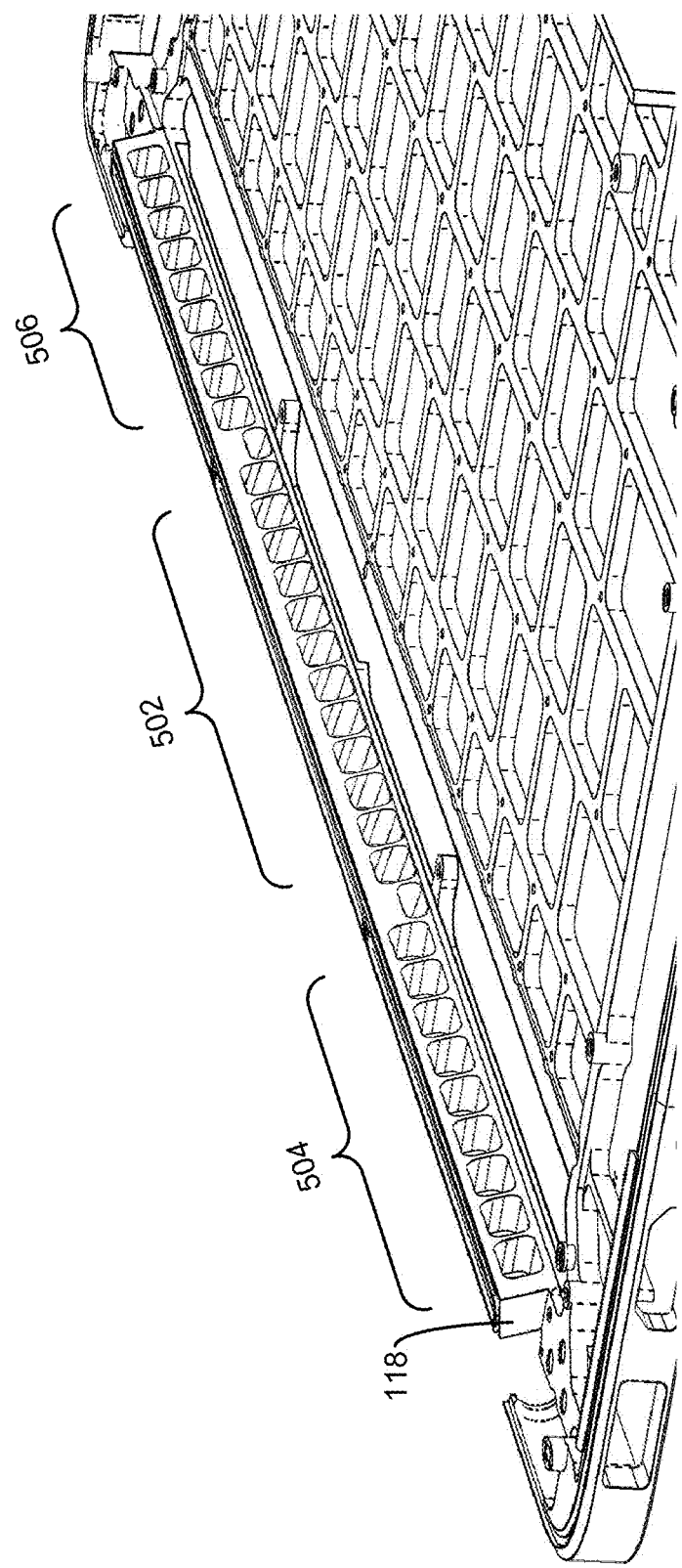
FIG. 5 shows a wall in an electronic device in accordance with the disclosed embodiments.

FIG. 5 shows wall 118 in accordance with the disclosed embodiments. Wall 118 may be a rear wall of an electronic device, such as a laptop computer. The rear wall may be integrated into a top case of the laptop computer to reduce the number of seams and/or components in the laptop computer's enclosure. For example, instead of creating wall 118 as a separate part and subsequently joining wall 118 to the top case, wall 118 may be machined out of the top case. In turn, the reduced number of seams and/or components in the enclosure may mitigate electromagnetic interference caused by the enclosure and/or improve the rigidity and/or height tolerance of the enclosure.

As shown in FIG. 5, wall 118 includes an intake zone 502 and two exhaust zones 504-506. Intake zone 502 includes a set of intake vents around the center of wall 118 that allow a set of fans (e.g., fans 102-104 of FIG. 1) to draw cooler air from the exterior of the electronic device into the electronic device. The fans may then circulate the air inside a set of plenums and/or thermal gaps (e.g., thermal gap 220 of FIG. 2) within the electronic device and expel the heated air out of the electronic device through a set of exhaust vents in exhaust zones 504-506 on either side of intake zone 502. As discussed in further detail below with respect to FIGS. 7-8, the intake vents may be directed at a first angle toward one or more heat-generating components of the electronic device, and the exhaust vents may be directed at a second angle out of the electronic device.

Figure 6:
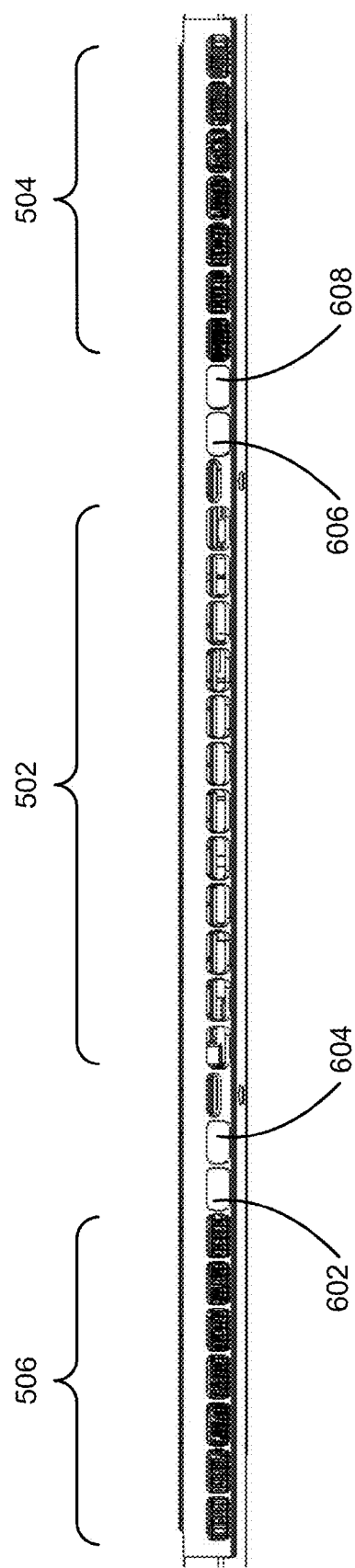
FIG. 6 shows a rear view of a set of intake and exhaust zones in an electronic device in accordance with the disclosed embodiments.

FIG. 6 shows a rear view of a set of intake and exhaust zones 502-506 of an electronic device in accordance with the disclosed embodiments. As described above, intake zone 502 may include a set of intake vents that are used by fans to draw in air from outside the electronic device, while each exhaust zone 504-506 may include a set of exhaust vents that are used by the fans to expel heated air out of the electronic device.

In addition, a set of obstructed vents 602-608 may separate intake zone 502 from exhaust zones 504-506. Air flow from vents 602-608 may be blocked from the inside of the electronic device by a portion of a duct formed by a gasket in the electronic device, as described below with respect to FIG. 10. Such obstruction of substantially evenly spaced openings in intake and exhaust zones 502 and exhaust zones 504-506 may maintain the cosmetic continuity of the vents in intake and exhaust zones 502-506, reduce electromagnetic interference from the enclosure of the electronic device, and facilitate heat dissipation in the electronic device by separating the intake and exhaust flows passing through intake and exhaust zones 502-506, respectively.

Figure 7:
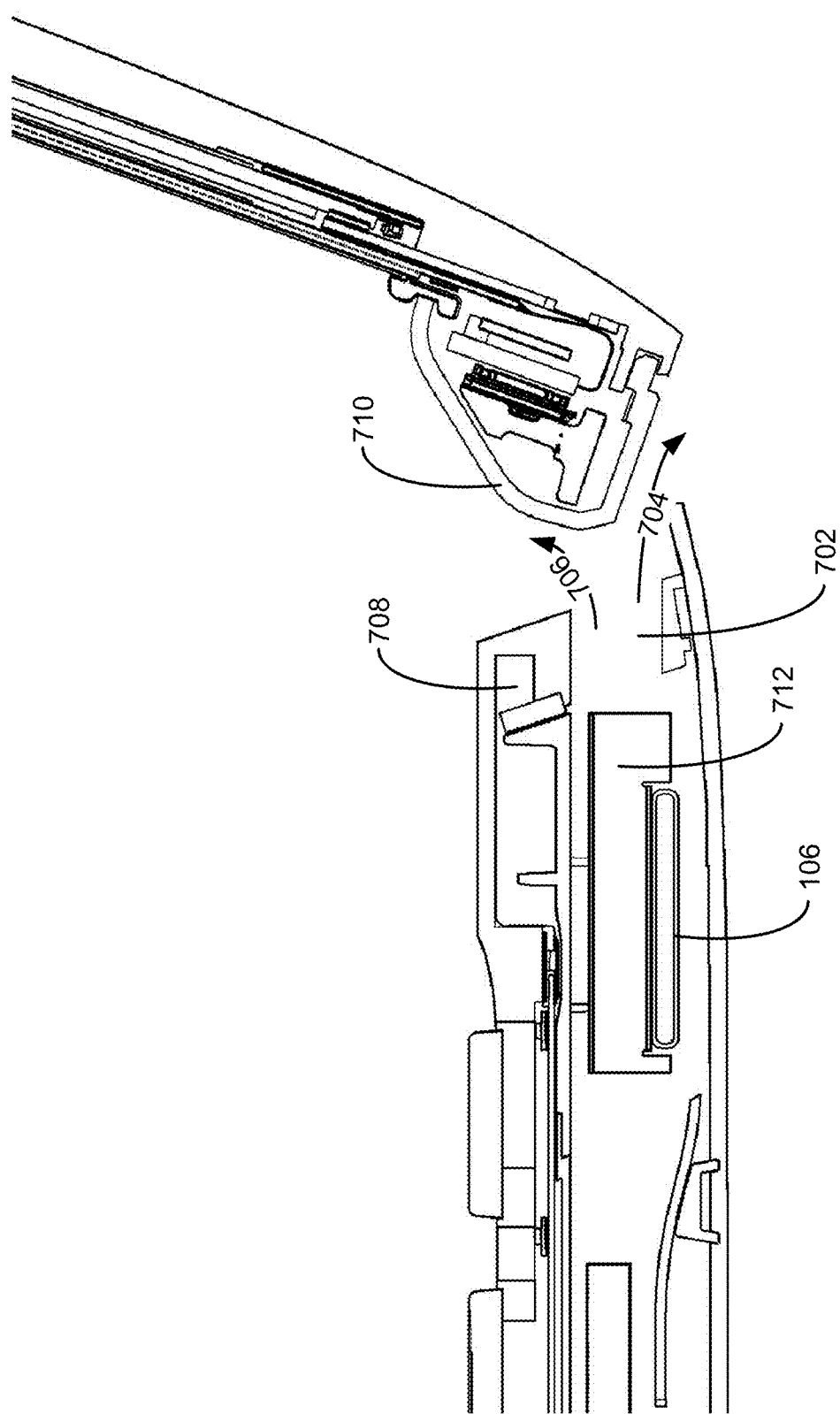
FIG. 7 shows a cross-sectional view of an electronic device in accordance with the disclosed embodiments.

FIG. 7 shows a cross-sectional view of an electronic device in accordance with the disclosed embodiments. More specifically, FIG. 7 shows a cross-sectional view of an exhaust vent 702 from an exhaust zone (e.g., exhaust zones 504-506 of FIG. 5) in a wall (e.g., wall 118 of FIG. 1) of the electronic device. Air from the interior of the electronic device may be moved by a fan (e.g., fans 102-104 of FIG. 1) across heat pipe 106 and a heat sink 712, where the air is heated and expelled as exhaust out of exhaust vent 702.

In addition, two flows 704-706 of exhaust out of vent 702 may be created by a clutch barrel 710 connecting a display of the electronic device (e.g., a laptop computer) to the bottom portion of the electronic device. Flow 704 may exit the electronic device along the bottom of clutch barrel 710, while flow 706 may exit the electronic device over the top of clutch barrel 710. To prevent exhaust from changing the white point of and/or accelerating degradation in the display, exhaust vent 702 may be directed at an angle out of the electronic device so that exhaust flows 704-706 avoid the display and/or do not create a large temperature gradient across the display. If the display is closed over the bottom portion of the electronic device, flow 706 may cease, and all exhaust may be expelled out of vent 702 through an air gap between the bottom of the electronic device and clutch barrel 710.

Those skilled in the art will appreciate that exhaust flowing out of exhaust vent 702 may also heat material in the wall near exhaust vent 702 and create a hot spot in the enclosure of the electronic device. As a result, a T-cut 708 may be made in the material to reduce the thickness of the material and, in turn, the transfer of heat through the material. At the same time, the thickness of the material between exhaust vent 702 and one or more intake vents in the electronic device may be maintained to facilitate lateral conduction of heat from exhaust vent 702 to the intake vent(s), thus further reducing the temperature of the hot spot. Consequently, the relatively large size of exhaust vent 702, T-cut 708, and/or ridges at the bottom of exhaust vent 702 may provide a lightweight structure with thermally minimal spars, a reduced conduction path to both the top and bottom enclosures of the electronic device, and a lateral conduction path between the exhaust and intake zones in the wall.

Figure 8:
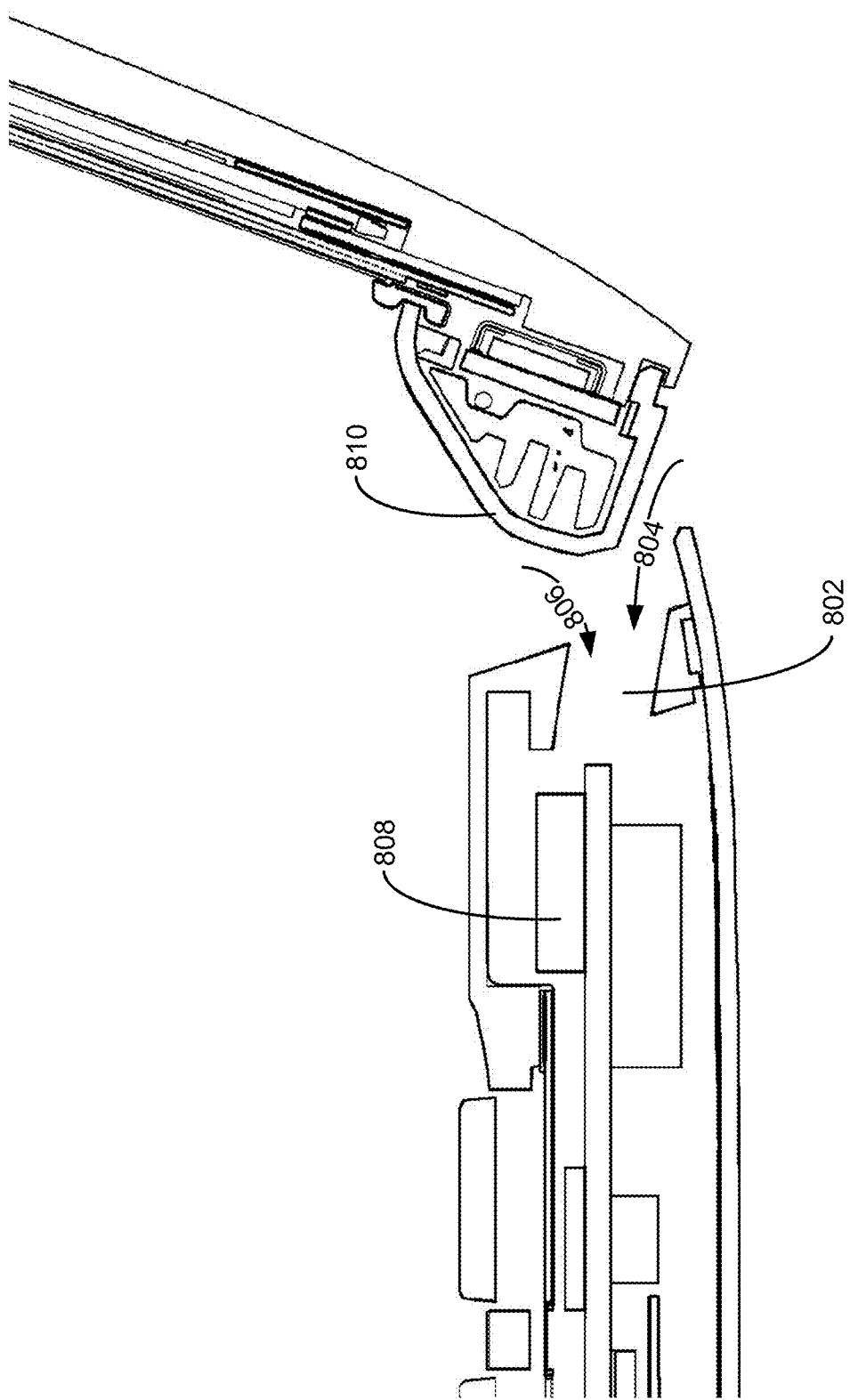
FIG. 8 shows a cross-sectional view of an electronic device in accordance with the disclosed embodiments.

FIG. 8 shows a cross-sectional view of an electronic device in accordance with the disclosed embodiments. In particular, FIG. 8 shows a cross-sectional view of an intake vent 802 from an intake zone (e.g., intake zone 502 of FIG. 5) in a wall (e.g., wall 118 of FIG. 1) of the electronic device. Intake vent 802 may allow cooler air from outside the electronic device to be drawn into the electronic device by a fan (e.g., fans 102-104 of FIG. 1) and circulated within the electronic device before being expelled as exhaust out of one or more exhaust vents (e.g., exhaust vent 702 of FIG. 7) in the wall.

Two flows 804-806 of air may pass through intake vent 802 while a display of the electronic device (e.g., a laptop computer) is open. Flow 804 may enter the electronic device along the bottom of a clutch barrel 810 connecting the display to the bottom of the electronic device, while flow 806 may enter the electronic device from the top of clutch barrel 810. If the display is closed over the bottom of the electronic device, flow 806 may cease, and all air drawn in through intake vent 802 may flow 804 from an air gap between the bottom of the electronic device and clutch barrel 810.

Moreover, intake vent 802 may be directed at an upward angle toward a heat-generating component 808 of the electronic device to facilitate heat dissipation from heat-generating component 808. For example, intake vent 802 may channel air over the top of a PCB containing video memory to cool the video memory and/or other heat-generating components at the top of the PCB. As a result, air passing through intake vent 802 may dissipate heat from heat-generating component 808 better than air passing through an intake vent that is not angled upwards into the interior of the electronic device.

Figure 9:
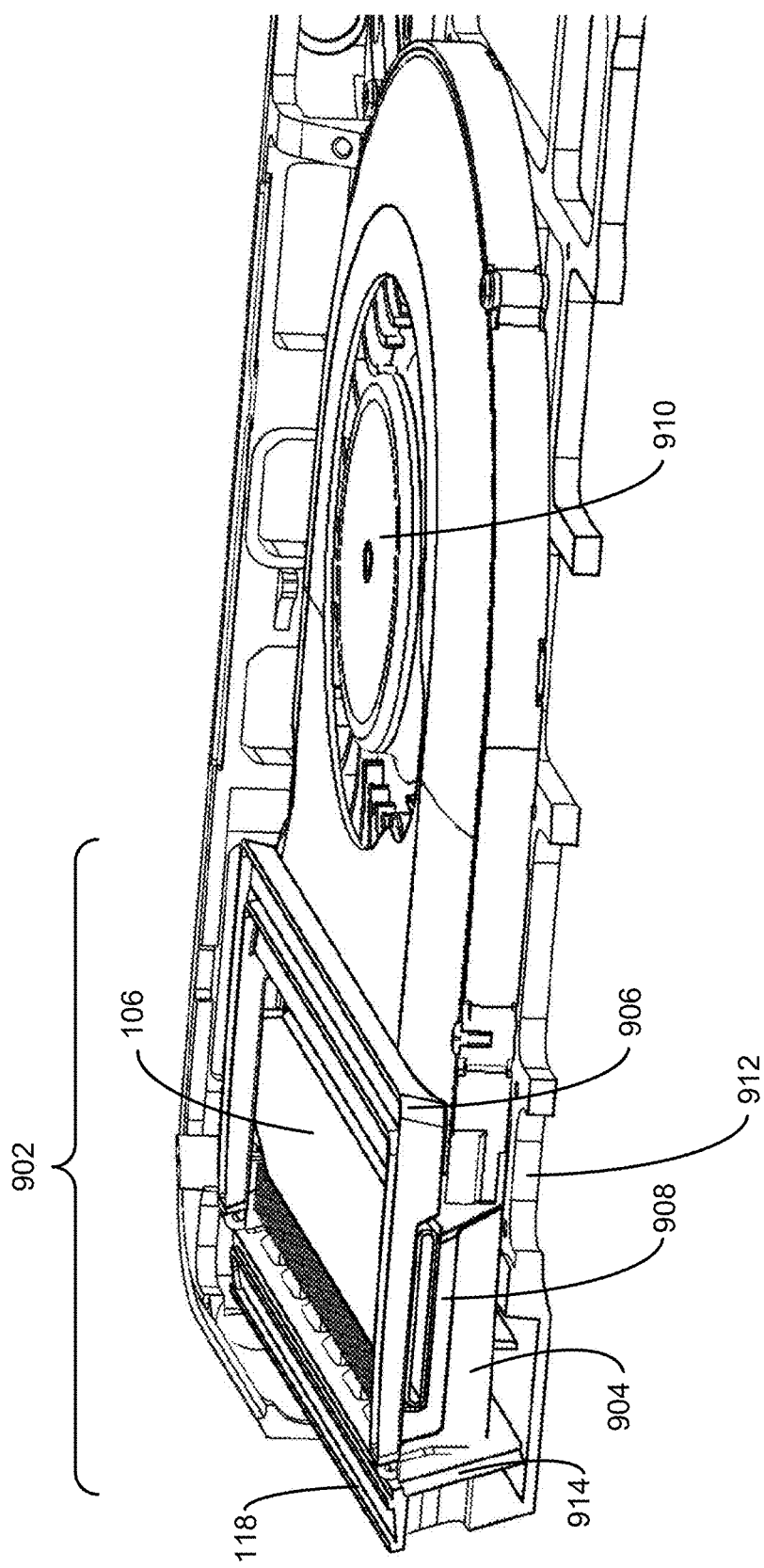
FIG. 9 shows a gasket in an electronic device in accordance with the disclosed embodiments.

FIG. 9 shows a gasket 902 (e.g., gaskets 120-122 of FIG. 1) in an electronic device in accordance with the disclosed embodiments. As mentioned above, gasket 902 may form a thermal duct between a fan 910 and a set of exhaust vents in wall 118 to prevent exhaust from recirculating inside the electronic device and reducing the effectiveness of heat dissipation from heat-generating components in the electronic device.

As shown in FIG. 9, gasket 902 may include three portions 904-908. A rigid portion 904 may be disposed around a bottom of heat pipe 106 to form the duct between fan 910 and wall 118. Two flexible portions 904-906 may then be bonded to rigid portion 904 so that gasket 902 is manufactured as a single component instead of multiple components that require multiple steps to assemble into gasket 902. For example, flexible portions 904-906 may be made of a rubber that is bonded to a rigid portion 904 made of plastic using an overmolding technique.

Portion 906 may be a flap that is open during assembly of heat pipe 106 in the electronic device to allow heat pipe 106 to be placed over portions 904 and 908. Portion 906 may then be closed over heat pipe 106 and portions 904 and 908 to seal the duct around heat pipe 106 after the assembly. Portions 904-906 may further seal the duct around fan 910, a bottom enclosure (not shown) of the electronic device, a top enclosure 912 of the electronic device, and/or exhaust vents in wall 118. For example, portion 906 may fold over portions 904 and 908 to seal along the top of fan 910, the top and/or sides of heat pipe 106, and/or the bottom enclosure. On the other hand, portion 908 may be bonded to one or more edges of portion 904 and seal along the bottom of fan 910, the bottom and/or sides of heat pipe 106, top enclosure 912, and/or wall 118. Gasket 902 may also include an additional flexible portion 914 that seals the duct along wall 118. Alternatively, portion 914 may be provided by a separate component (e.g., a gasket) disposed between gasket 902 and wall 118.

Figure 10:
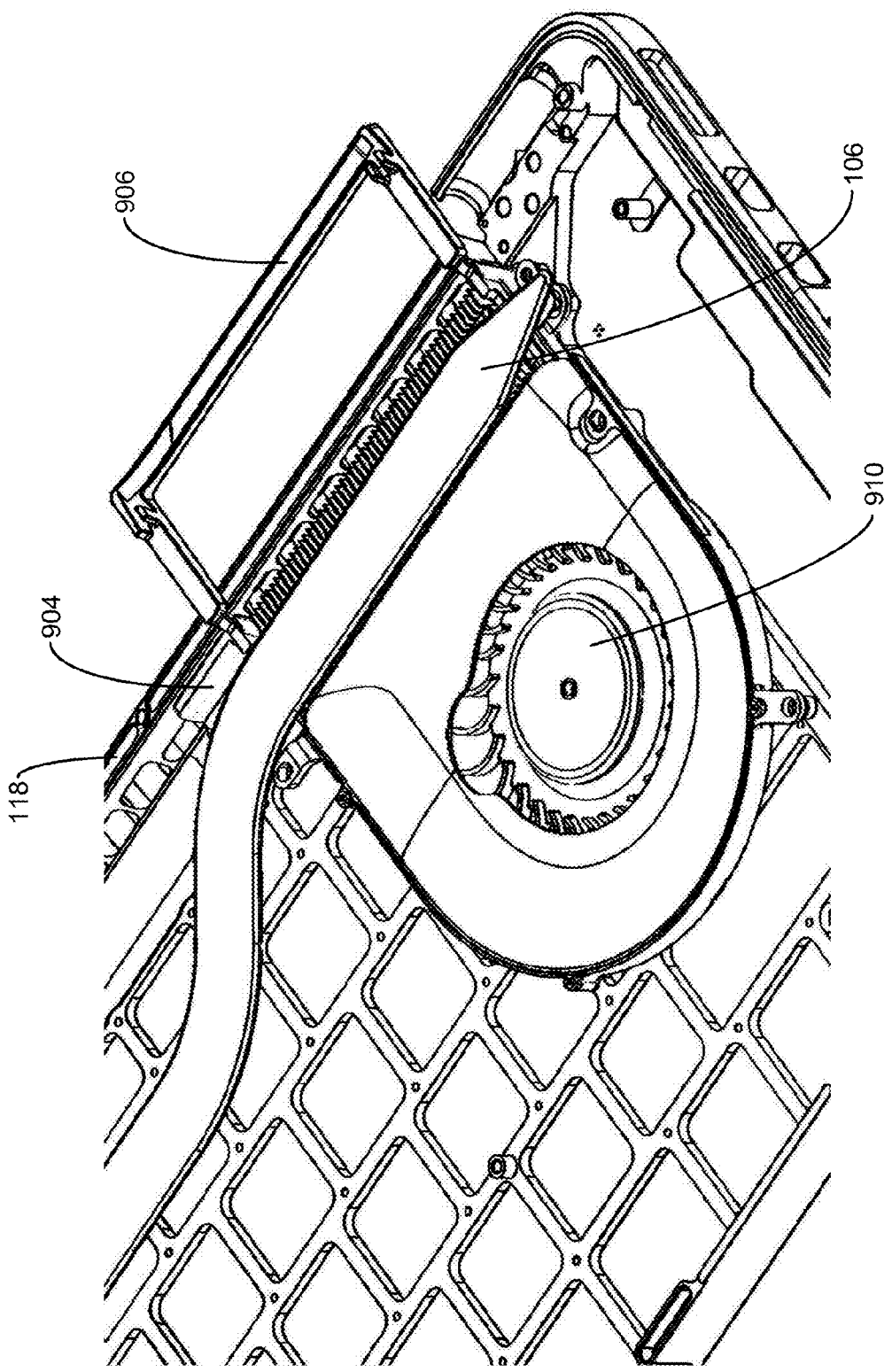
FIG. 10 shows a flexible portion of a gasket in accordance with the disclosed embodiments.

FIG. 10 shows flexible portion 906 of a gasket (e.g., gasket 902 of FIG. 9) in accordance with the disclosed embodiments. As mentioned above, portion 906 includes a flap that is open during assembly of heat pipe 106 in the electronic device. For example, the electronic device may be assembled by placing the gasket into the top enclosure of the electronic device with portion 906 open over wall 118. After the gasket is placed into the top enclosure of the electronic device, a part of rigid portion 904 may obstruct one or more vents in wall 118 to separate the intake and exhaust zones of wall 118. Next, fan 910 may be placed next to the gasket, and heat pipe 106 may be placed on top of rigid portion 904 and/or a second flexible portion (e.g., portion 908 of FIG. 9) of the gasket.

Figure 11:
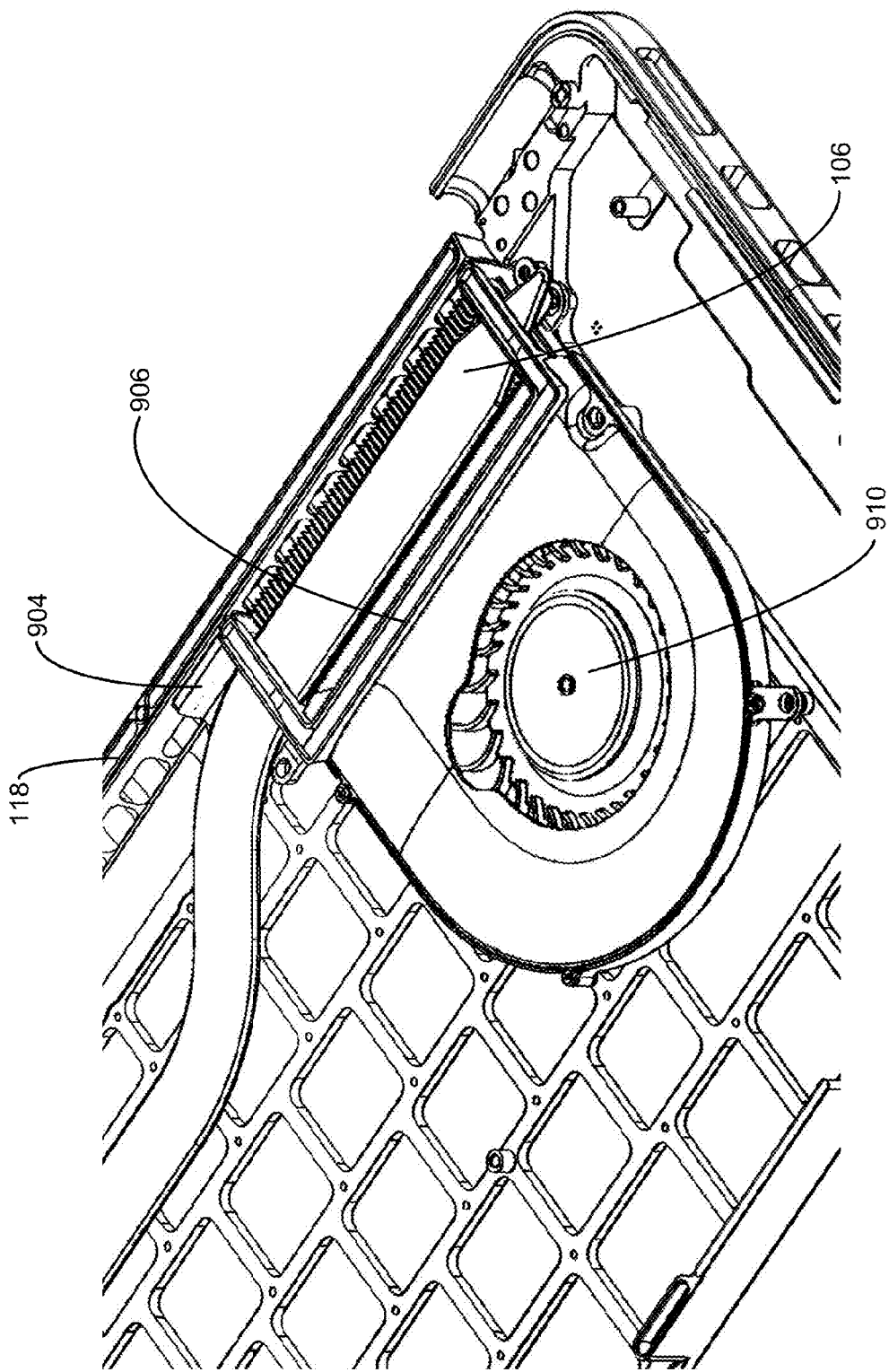
FIG. 11 shows a flexible portion of a gasket in accordance with the disclosed embodiments.

FIG. 11 shows flexible portion 906 of a gasket (e.g., gasket 902 of FIG. 9) in accordance with the disclosed embodiments. As shown in FIG. 11, portion 906 may be closed over heat pipe 106, rigid portion 904, and the second flexible portion after heat pipe 106 is assembled in the electronic device. The bottom enclosure of the electronic device may then be placed over the gasket to create a compression seal around heat pipe 106, fan 910, one or more exhaust vents of wall 118, and/or the top enclosure of the electronic device. In addition, the insulating materials used in the gasket may restrict heat transfer between the exhaust and the enclosure of the electronic device, thus facilitating safe operation of the electronic device.

Figure 12:
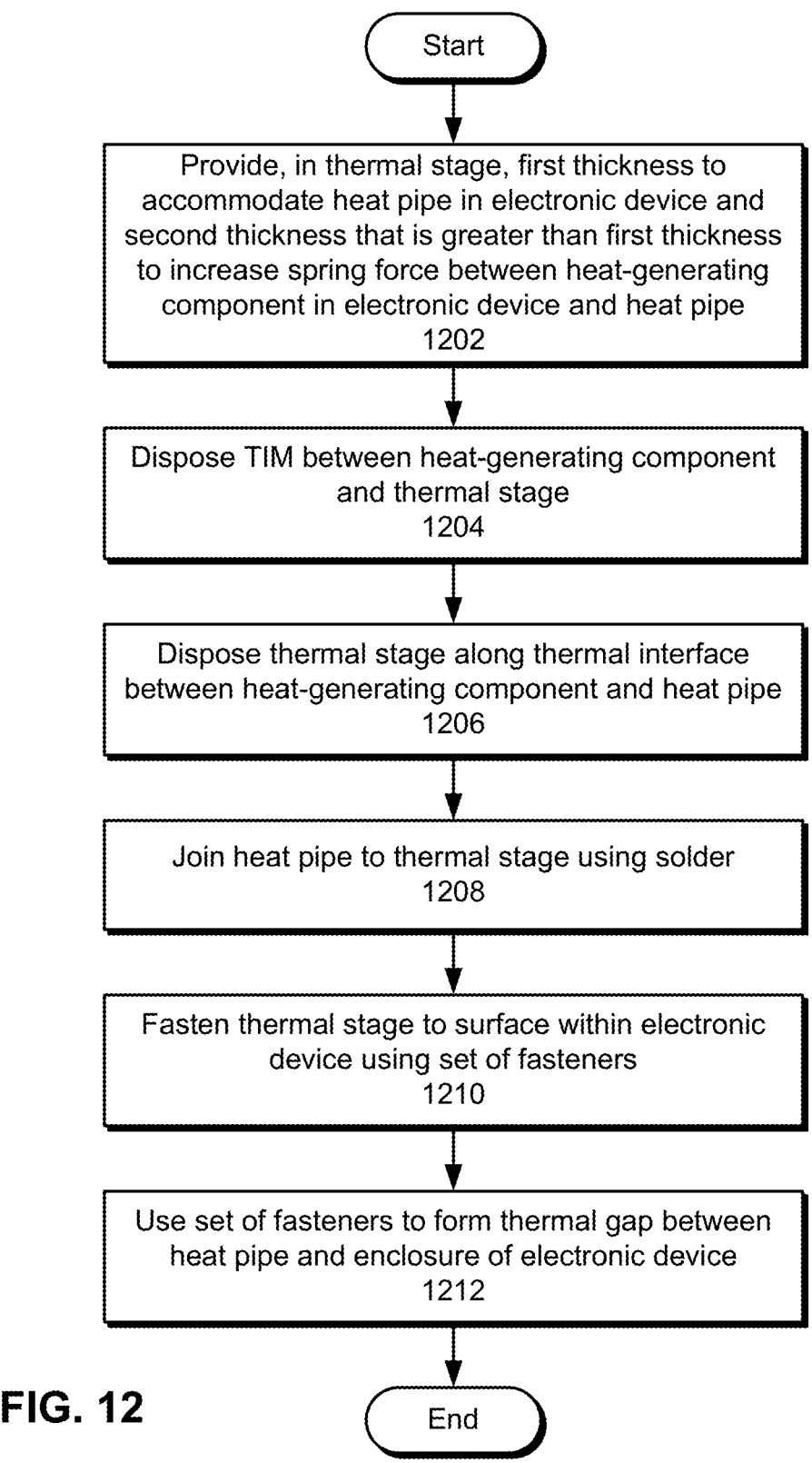
FIG. 12 shows a flow chart illustrating the process of facilitating heat transfer in an electronic device in accordance with the disclosed embodiments.

FIG. 12 shows a flow chart illustrating the process of facilitating heat transfer in an electronic device in accordance with the disclosed embodiments. In one or more embodiments, one or more of the steps may be omitted, repeated, and/or performed in a different order. Accordingly, the specific arrangement of steps shown in FIG. 12 should not be construed as limiting the scope of the embodiments.

Initially, a first thickness to accommodate a heat pipe in the electronic device and a second thickness that is greater than the first thickness to increase a spring force between the heat-generating component and the heat pipe are provided in a thermal stage (operation 1202). The thermal stage may be made of copper titanium and/or another material with a high thermal conductivity and/or spring constant. The first and/or second thicknesses may be created using a machining technique, a rolling technique, a skiving technique, a forging technique, a coining technique, a chemical etching technique, and/or a casting technique.

Next, a TIM is disposed between the heat-generating component and the thermal stage (operation 1204). For example, the TIM may be applied to a surface of the heat-generating component and/or the thermal stage. The thermal stage is then disposed along a thermal interface between the heat-generating component and the heat pipe (operation 1206), and the heat pipe is joined to the thermal stage using a solder (operation 1208). For example, the thermal stage may be placed over the heat-generating component, and the heat pipe may be placed over the thermal stage and soldered to the thermal stage.

The thermal stage is also fastened to a surface within the electronic device using a set of fasteners (operation 1210), and the set of fasteners is used to form a thermal gap between the heat pipe and the enclosure of the electronic device (operation 1212). For example, the fasteners may include screws with tall heads that form a plenum between the heat pipe and enclosure through which air may flow to further dissipate heat from the heat-generating component. The screws may also separate the heat pipe from the enclosure, thus preventing the heat pipe from transmitting large amounts of heat through the enclosure. Similarly, the heads of the screws may include an insulating material such as plastic to prevent the heat-generating component from thermally contacting the enclosure if the enclosure touches the screws' heads (e.g., as a result of impact between the electronic device and a hard surface and/or by design).

Figure 13:
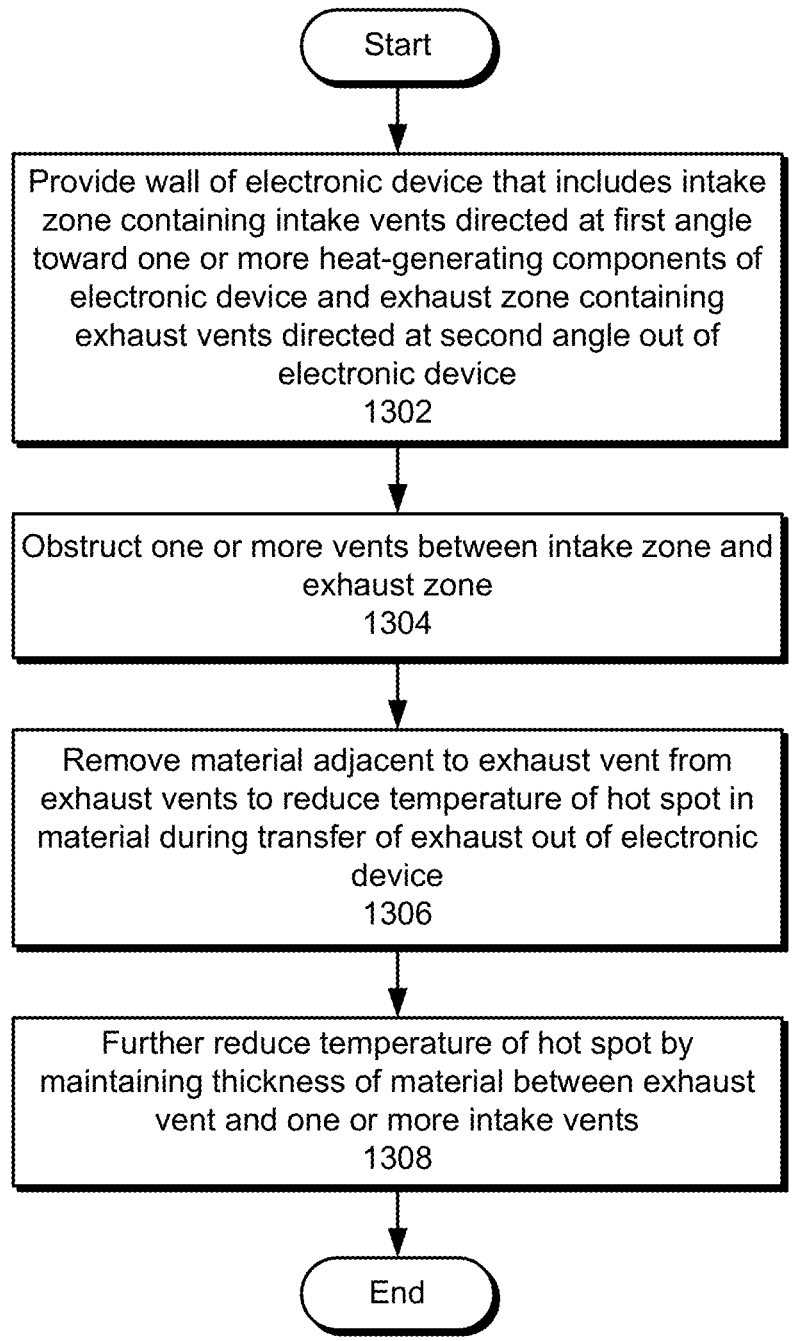
FIG. 13 shows a flow chart illustrating the process of facilitating heat transfer in an electronic device in accordance with the disclosed embodiments.

FIG. 13 shows a flow chart illustrating the process of facilitating heat transfer in an electronic device in accordance with the disclosed embodiments. In one or more embodiments, one or more of the steps may be omitted, repeated, and/or performed in a different order. Accordingly, the specific arrangement of steps shown in FIG. 13 should not be construed as limiting the scope of the embodiments.

Initially, a wall of the electronic device that includes an intake zone containing a set of intake vents directed at a first angle toward one or more heat-generating components of the electronic device and an exhaust zone containing a set of exhaust vents directed at a second angle out of the electronic device is provided (operation 1302). For example, the wall may be a rear wall that is integrated into a top case of a laptop computer. The first angle may facilitate the cooling of components at the top of a PCB in the laptop computer, while the second angle may direct exhaust out of the laptop computer so that the exhaust avoids the display of the laptop computer.

Next, one or more vents between the intake zone and exhaust zone are obstructed (operation 1304). The vents may be obstructed by a portion of a duct between a fan and the exhaust zone and/or another component in the electronic device. The obstructed vents may maintain the cosmetic continuity of the electronic device while separating the intake and exhaust flows passing through the intake and exhaust zones.

Material adjacent to the exhaust vent may also be removed to reduce a temperature of a hot spot in the material during the transfer of exhaust out of the electronic device (operation 1306). For example, the material may be removed using a T-cut to reduce the amount of heat conducted through the material to the outside of the electronic device's enclosure. The temperature of the hotspot may further be reduced by maintaining the thickness of the material between the exhaust vent and one or more intake vents (operation 1308) in the electronic device. For example, the thickness of material separating the exhaust vent from an intake vent to the side of the exhaust vent may be maintained to facilitate lateral conduction of heat from the exhaust vent to the intake vent.

Figure 14:
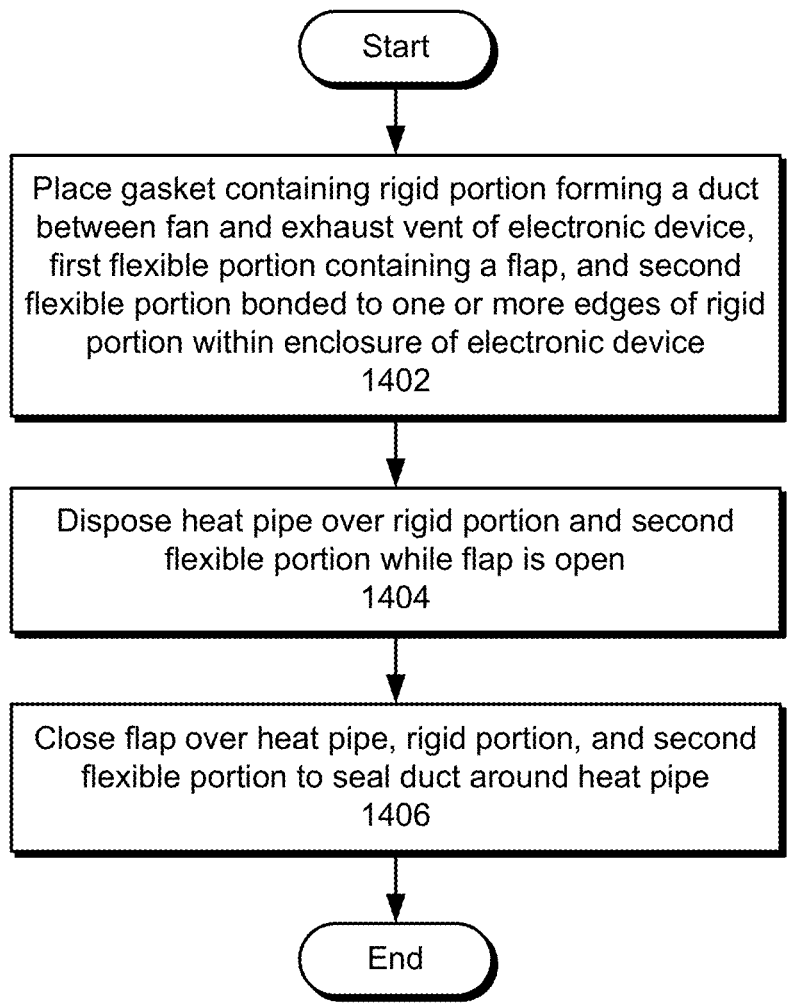
FIG. 14 shows a flow chart illustrating the process of assembling an electronic device in accordance with the disclosed embodiments.

FIG. 14 shows a flow chart illustrating the process of assembling an electronic device in accordance with the disclosed embodiments. In one or more embodiments, one or more of the steps may be omitted, repeated, and/or performed in a different order. Accordingly, the specific arrangement of steps shown in FIG. 14 should not be construed as limiting the scope of the embodiments.

First, a gasket containing a rigid portion forming a duct between a fan and exhaust vent of the electronic device, a first flexible portion containing a flap, and a second flexible portion bonded to one or more edges of the rigid portion is placed within an enclosure of the electronic device (operation 1402). For example, the gasket may be placed inside a top enclosure of the electronic device so that one end of the gasket is flush with a wall (e.g., wall 118 of FIG. 1) containing the exhaust vent, and a fan may be installed in the electronic device so that the other end of the gasket is flush with the fan. The rigid portion may be made of plastic, while the first and second flexible portions may be made of a rubber that is bonded to the rigid portion using an overmolding technique.

Next, a heat pipe is disposed over the rigid portion and second flexible portion while the flap is open (operation 1404). For example, the heat pipe may be assembled in the electronic device so that the heat pipe rests on top of the rigid portion and second flexible portion while the flap is open over the wall.

Finally, the flap is closed over the heat pipe, the rigid portion, and the second flexible portion to seal the duct around the heat pipe (operation 1406). The first and second flexible portions may also seal the duct around the fan, the bottom enclosure of the electronic device, the top enclosure of the electronic device, and/or the exhaust vent. The gasket may thus prevent recirculation of exhaust within the electronic device, simplify the assembly of the heat pipe and/or electronic device, and/or insulate the enclosure of the electronic device from the heated exhaust.

Figure 15:
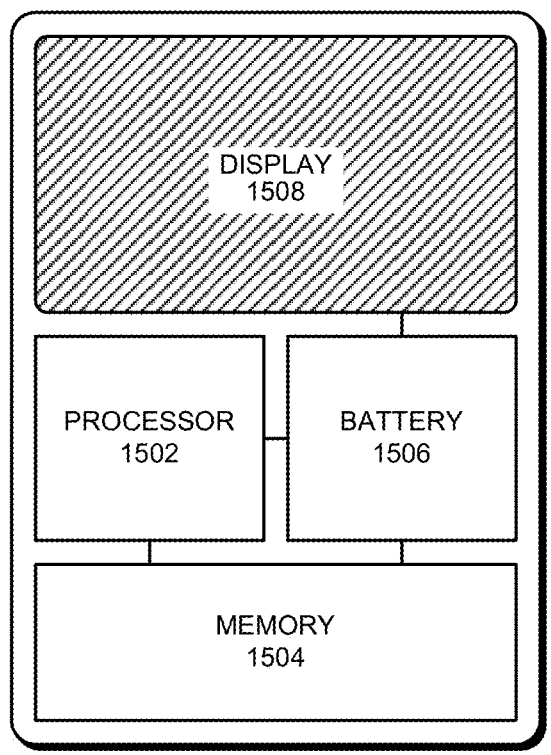
FIG. 15 shows a portable electronic device in accordance with the disclosed embodiments.

The above-described heat transfer mechanisms can generally be used in any type of electronic device. For example, FIG. 15 illustrates a portable electronic device 1500 which includes a processor 1502, a memory 1504 and a display 1508, which are all powered by a battery 1506. Portable electronic device 1500 may correspond to a laptop computer, tablet computer, mobile phone, personal digital assistant (PDA), portable media player, digital camera, and/or other type of battery-powered electronic device. To cool heat-generating components in portable electronic device 1500, portable electronic device 1500 may include a heat pipe that conducts heat away from the heat-generating components and/or one or more fans that expel the heat out of portable electronic device 1500.

Portable electronic device 1500 may also include a thermal stage disposed along a thermal interface between a heat-generating component and the heat pipe. The thermal stage may include a first thickness to accommodate the heat pipe and a second thickness that is greater than the first thickness to increase the spring force between the heat-generating component and the heat pipe. The thermal stage may also be fastened to a surface within portable electronic device 1500 by a set of fasteners that form a thermal gap between the heat pipe and the enclosure of portable electronic device 1500.

To further facilitate cooling of the heat-generating components, a wall of portable electronic device 1500 may include an intake zone containing a set of intake vents directed at a first angle toward one or more of the heat-generating components. The wall may also include an exhaust zone containing a set of exhaust vents directed at a second angle out of the electronic device (e.g., to avoid a display of the electronic device). One or more vents may be obstructed between the intake and exhaust zones to separate the intake and exhaust zones. In addition, the temperature of a hot spot near an exhaust vent may be reduced by removing material adjacent to the exhaust vent and/or maintaining a thickness of the material between the exhaust vent and one or more intake vents.

Finally, a gasket may prevent the recirculation of exhaust inside the electronic device. The gasket may include a rigid portion that forms a duct between a fan and an exhaust vent. The gasket may also include a first flexible portion bonded to the rigid portion, as well as a second flexible portion bonded to one or more edges of the rigid portion. The first flexible portion may be a flap that is open during assembly of the heat pipe in the electronic device and closed over the heat pipe and the rigid portion to seal the duct around the heat pipe after the assembly. The first and second flexible portions may further seal the duct around the fan, the bottom enclosure of the electronic device, the top enclosure of the electronic device, and/or the exhaust vent.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for facilitating heat transfer in an electronic device, comprising:
    a heat pipe configured to conduct heat away from a heat-generating component in the electronic device; and
    a thermal stage disposed along a thermal interface between the heat-generating component and the heat pipe, wherein the thermal stage applies a spring force between the heat-generating component and the heat pipe; and
    a set of fasteners configured to:
        fasten the thermal stage to a surface within the electronic device; and
        form a thermal gap between the heat pipe and an enclosure of the electronic device;
    wherein the set of fasteners comprises a screw;
    wherein the thermal gap is formed by a head of the screw; and
    wherein the head comprises an insulating material.

2. The system of claim 1, wherein the surface is a printed circuit board (PCB) in the electronic device.

3. The system of claim 1, wherein the heat-generating component is a central processing unit (CPU).

4. A method for facilitating heat transfer in an electronic device, comprising:
    disposing a thermal stage along a thermal interface between a heat-generating component in the electronic device and a heat pipe; and
    fastening the thermal stage to a surface within the electronic device using a set of fasteners; and
    using the set of fasteners to form a thermal gap between the heat pipe and an enclosure of the electronic device;
    wherein the set of fasteners comprises a screw;
    wherein the thermal gap is formed by a head of the screw; and
    wherein the head comprises an insulating material.

5. The method of claim 4, wherein the surface is a printed circuit board (PCB) in the electronic device.

6. The method of claim 4, wherein the heat-generating component is a central processing unit (CPU).

7. An electronic device, comprising:
    a heat-generating component, wherein the heat-generating component is a processor or a memory;
    a heat pipe configured to conduct heat away from the heat-generating component;
    a thermal stage disposed along a thermal interface between the heat-generating component and the heat pipe; and
    a set of fasteners configured to:
        fasten the thermal stage to a surface within the electronic device; and
        form a thermal gap between the heat pipe and an enclosure of the electronic device;
    wherein the set of fasteners comprises a screw;
    wherein the thermal gap is formed by a head of the screw; and
    wherein the head comprises an insulating material.

8. The electronic device of claim 7, wherein the surface is a printed circuit board (PCB) in the electronic device.

9. A system for facilitating heat transfer in an electronic device, comprising:
    a heat pipe configured to conduct heat away from a heat-generating component in the electronic device; and
    a thermal stage disposed along a thermal interface between the heat-generating component and the heat pipe, comprising:
        a first thickness to accommodate the heat pipe, and a second thickness that is greater than the first thickness to increase a spring force between the heat-generating component and the heat pipe.

10. The system of claim 9, wherein the thermal interface further comprises:
a thermal interface material (TIM) disposed between the heat-generating component and the thermal stage.

11. The system of claim 9, wherein the heat pipe is joined to the thermal stage using a solder.

12. The system of claim 9, wherein the first thickness decreases an overall thickness of the electronic device.

13. The system of claim 9, wherein the heat-generating component is at least one of a central processing unit (CPU) and a graphics-processing unit (GPU).

14. The system of claim 9, wherein the first thickness is created in the thermal stage using at least one of:
a machining technique;
a rolling technique;
a skiving technique;
a continuous-machining technique;
a chemical-etching technique;
a coining technique;
a casting technique; and
a forging technique.

15. The system of claim 9, wherein the thermal stage comprises copper titanium.

16. The system of claim 9, wherein the heat pipe comprises copper.

17. A method for facilitating heat transfer in an electronic device, comprising:
providing, in a thermal stage, a first thickness to accommodate a heat pipe in the electronic device and a second thickness that is greater than the first thickness to increase a spring force between a heat-generating component in the electronic device and a heat pipe; and
disposing the thermal stage along a thermal interface between the heat-generating component and the heat pipe.

18. The method of claim 17, further comprising:
disposing a thermal interface material (TIM) between the heat-generating component and the thermal stage.

19. The method of claim 17, further comprising:
joining the heat pipe to the thermal stage using a solder.

20. The method of claim 17, wherein the first thickness decreases an overall thickness of the electronic device.

21. The method of claim 17, wherein the first thickness is created in the thermal stage using at least one of:
a machining technique;
a rolling technique;
a skiving technique;
a continuous-machining technique;
a chemical-etching technique;
a coining technique;
a casting technique; and
a forging technique.

22. The method of claim 17, wherein the thermal stage comprises copper titanium.

23. An electronic device, comprising:
a heat-generating component, wherein the heat-generating component is a processor or a memory;
a heat pipe configured to conduct heat away from the heat-generating component; and
a thermal stage disposed along a thermal interface between the heat-generating component and the heat pipe, comprising:
a first thickness to accommodate the heat pipe, and
a second thickness that is greater than the first thickness to increase a spring force between the heat-generating component and the heat pipe.

24. The electronic device of claim 23, wherein the heat pipe is joined to the thermal stage using a solder.

25. The electronic device of claim 23, wherein the first thickness decreases an overall thickness of the electronic device.

26. The electronic device of claim 23, wherein the first thickness is created in the thermal stage using at least one of:
a machining technique;
a rolling technique;
a skiving technique;
a continuous-machining technique;
a chemical-etching technique;
a coining technique;
a casting technique; and
a forging technique.

27. The electronic device of claim 23, wherein the thermal stage comprises copper titanium.

* * * * *